United States Patent [19]
Bohne

[11] 3,994,794
[45] Nov. 30, 1976

[54] SACRIFICIAL ANODE
[75] Inventor: Alvin W. Bohne, Long Grove, Ill.
[73] Assignee: The Tapecoat Company, Inc., Evanston, Ill.
[22] Filed: Dec. 30, 1969
[21] Appl. No.: 3,607

Related U.S. Application Data
[62] Division of Ser. No. 695,182, Jan. 2, 1968, Pat. No. 3,623,868.

[52] U.S. Cl. .............................. 204/197; 204/280; 204/286
[51] Int. Cl.² ....................................... C23F 13/00
[58] Field of Search ........... 204/147, 148, 196, 197, 204/286, 290 R, 297, 280

[56] References Cited
UNITED STATES PATENTS

| | | | |
|---|---|---|---|
| 1,646,736 | 10/1927 | Mills | 204/197 |
| 1,867,984 | 7/1932 | Pistor | 204/147 |
| 2,779,729 | 1/1957 | Jorgensen | 204/197 |
| 2,926,128 | 2/1960 | Flower | 204/196 |
| 3,202,596 | 8/1965 | Canevari | 204/197 |
| 3,230,192 | 1/1966 | Mazurk | 264/176 |
| 3,260,661 | 7/1966 | Kemp et al. | 204/197 |
| 3,347,950 | 10/1967 | Mazurk | 260/735 |
| 3,494,849 | 2/1970 | Hess | 204/197 |

OTHER PUBLICATIONS
"Cathodic Protection of Submarine Pipeline", reprint from Federated Metals Digest, 1958, 204–197.

*Primary Examiner*—T. Jung
*Attorney, Agent, or Firm*—Coffee and Sweeney

[57] ABSTRACT

A sacrificial anode and a protective coating for cathodically protecting a pipeline against corrosion especially in underground installation. The preferred anode includes a tubular shell of sacrificial anodic material electrically contacted by integral or intermediate contacts with the pipe andd having a longitudinal seam for opening and closing the anode to place it around the pipe with corrosion and electrical resistant coating material between the anode and pipe. The outer surface of the anode can have a coating of a salt material suitable for forming an electrolyte with water in the surrounding soil. In a preferred and easily installable form, the anode comprises a pair of shell halves having a coating material secured to the inner surface thereof and extending longitudinally beyond the shell halves to overlap the coating material of pipe sections at a ends of the mill-wrap coating cut-back.

4 Claims, 10 Drawing Figures

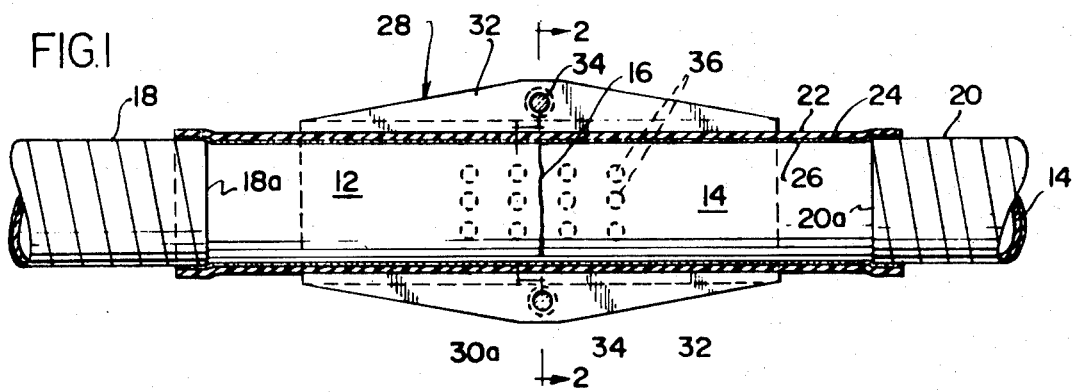
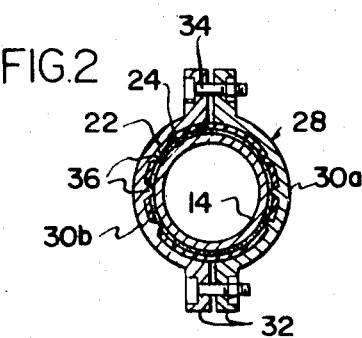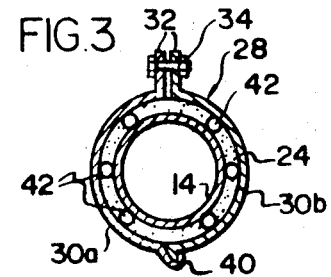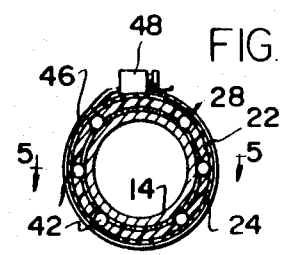
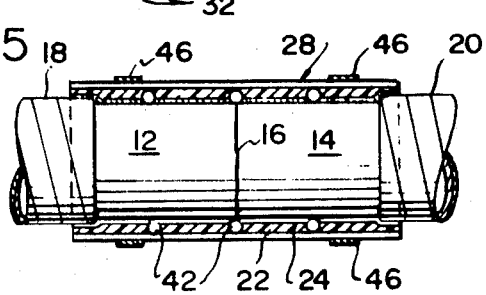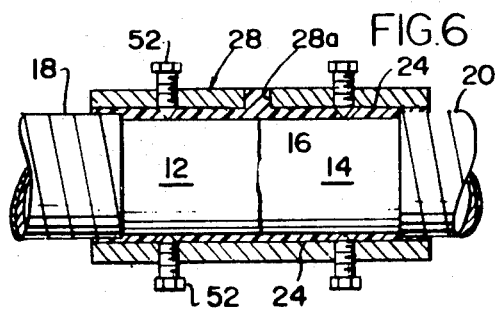
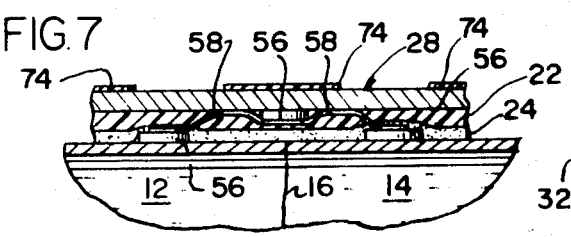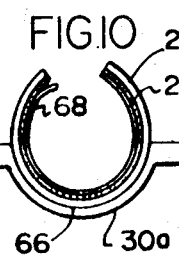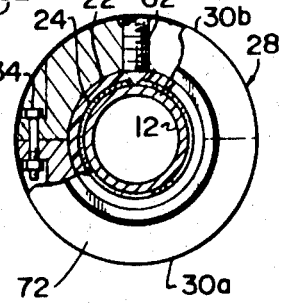
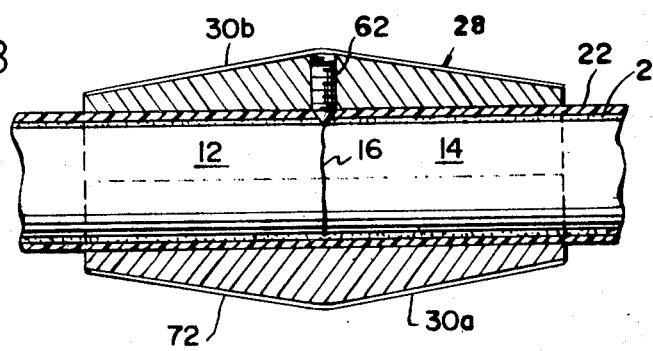

SACRIFICIAL ANODE

CROSS REFERENCE TO RELATED APPLICATIONS

This is a division of my co-pending application Ser. No. 695,182, filed Jan. 2, 1968, now U.S. Pat. No. 3,623,868, entitled "Sacrificial Anode and Pipe Protected Thereby", issued Nov. 30, 1971.

BACKGROUND OF THE INVENTION

1. Field of the Invention

This invention relates to sacrificial anodes and protective coatings and their use especially in underground installations.

2. Description of the Prior Art

In laying underground pipe, the pipe sections are welded end-to-end, the cutback, i.e. the area at the joint where the mill-wrap coating is removed, is coated and the assembled pipe is then dragged to location and plowed in to location or lowered in a trench and backfilled. Although many forms of sacrificial anodes are described in the patent art, present commercial methods for cathodic protection of coated pipes to be installed underground, e.g., gas lines, water lines, and the like, involve placing the anode in an adjacent underground location and running an underground lead wire from the anode to the pipe. The lead wire is then welded to the pipe which disrupts the coating. The pipe must then be recoated at the weld site which is an expensive and time consuming operation. Anodes are usually installed at intervals of about 1000 feet along the pipe and the anodes are of sufficient size and spaced a sufficient distance from the pipe for protecting the length of pipe therebetween.

More particularly, the installation of such anodes involves digging a separate trench for each anode extending outward from the main trench which receives the pipe. The pipe is placed in the main trench and an anode is placed at the end of each separate anode trench; the lead wires are extended back to the pipe and brazed or welded to the pipe. The welding sites are recoated and the anode installation trenches and pipe trenches are filled to complete the installation.

Such operation sometimes results in incomplete electrical contact of the lead wire to the pipe because of the presence of primers or coating materials at the weld site. At times a worker in the field will either forget or neglect to attach the anode or will simply omit the anode because of the additional work involved for the anode installation. Other disadvantages of this type of installation arise from failure or error in recording anode locations for future reexcavation, damage to lead wires by other and later excavation, failure to install the anode at a proper depth and excessive cost of this method of anode installation. Also, the anodes now conventionally used cannot be attached to the pipe and plowed or dragged with the pipe to the installation site because they will snag during plowing or dragging and become disconnected from the pipe.

SUMMARY OF THE INVENTION

Briefly, this invention provides a sacrificial anode and coating for protecting pipe joints and pipe or the like which minimize the disadvantages of the present commercial form. The anode is a package device which is easily installed for sure protection and at low cost. The sacrificial anode of this invention provides, among others, a superior distribution of protective current because the anodes are installed at more frequent intervals; a high ratio of surface to weight of anode for higher current output; simplicity of installation; reduced drag in plowing in operations; single application of joint coating and anode; and the weight of the pipe on the anode assures better contact between soil and anode. Electrical contact elements are provided as part of the anode package for extending through corrosion and electrical resistant coating material and contacting the pipe. In a very useful form, the anode is of cylindrical or tubular configuration.

While this invention is susceptible of embodiment in many different forms, there are shown in the drawings and will herein be described in detail forms of the invention with the understanding that the present disclosure is to be considered as an exemplification of the principles of the invention and is not intended to limit the invention to the forms illustrated.

BRIEF DESCRIPTION OF THE DRAWINGS

FIG. 1 is a fragmentary section of a pipe joint assembly illustrating one form of anode of the present invention;

FIG. 2 is a section along line 2—2 of FIG. 1;

FIG. 3 is a section through a pipe equipped with another embodiment of the anode;

FIG. 4 is a section showing still another embodiment of the anode;

FIG. 5 is a fragmentary section along line 5—5 of FIG. 4;

FIG. 6 is a fragmentary section through still another embodiment of the anode this invention;

FIG. 7 is a fragmentary section through a protective anode system of the present invention assembled at a pipe joint in accordance with a form of the invention;

FIG. 8 is a section through yet another embodiment of the anode of this invention assembled on a pipe;

FIG. 9 is a fragmentary view from the end of the device shown in FIG. 8; and

FIG. 10 is an end view of an anode half shell and coating material combination suitable for use in forming an anode shell such as is illustrated in FIGS. 1 and 2.

DESCRIPTION OF THE PREFERRED EMBODIMENTS

The sacrificial anode of the present invention can be installed over welded pipe section joints during joining of pipe sections and a completed cathodically protected and coated pipe length can be plowed in or lowered into a trench for underground installation.

In a preferred form the anode is a shell of sacrificial anodic material including a longitudinal seam in the shell wall which can be opened to place the anodic shell and coating around the welded pipe joint at the cutback. The tubular shell has an inner diameter larger than the outer diameter of the pipe at the joint to space the shell from the pipe. Electrical contact means extend between the shell and pipe and a corrosion and electrical resistant coating material, which can either be adhered to the inner surfaces of one or both halves of the anodic shell before it is placed on the pipe or can be placed on the pipe prior to the installation of the shell, is provided in the space between the pipe and anode. Usually the electrical contact means will be integral with the shell as inwardly projecting spurs or nibs, the inner ends of which tightly engage the pipe, or will be a separate means embedded in the coating material. A clamp system, such as flanges on the shell receiving a nut and bolt, or circumferential strapping or other means, can be provided to clamp the shell tightly toward the pipe to assure proper electrical contact.

The pipe joint assembly illustrated in FIGS. 1 and 2 includes two pipe sections 12 and 14 abutting and joined at a weld 16. The pipe sections 12 and 14 have mill wrapped coatings 18 and 20 terminating at 18a and 20a, short of weld 16, to define an uncoated cutback between 18a and 20a. A sheet or layer of protective coating material 22, e.g., in the form of an extruded pitch-polymer sheet having a mastic coating 24 on its inner surface, extends over the length of the cutback and overlaps coatings 18 and 20 and is adhered along its length to pipe sections 12 and 14 within the cutback and at its ends to the outer surface of coatings 18 and 20 by means of the mastic 24. The coating material 22 is preferably of the pitch-plasticized polyvinyl chloride type disclosed by L. R. Mazurk in U.S. Pat. No. 3,230,192. The mastic material is preferably a mixture of pitch, chlorinated biphenyl and chlorinated rubber such as is described by L. R. Mazurk in application Ser. No. 557,912 filed June 16, 1966.

To improve adherence of mastic 24 to pipe sections 12 and 14, the pipe can be primed over the length of the cutback with a suitable adhesive or primer material at 26.

Surrounding the coating material 22 is a sacrificial anode 28 which can be composed of any of the sacrificial anode materials, e.g., magnesium, aluminum, zinc, alloys thereof etc. In the form shown in FIGS. 1 and 2, the anode 28 is made up of two opposing shells 30a and 30b having opposing flanges 32 along each of two opposing seam lines. Bolts 34, of a material compatible with the anode, secure the anode shells to each other. The selection of the material of bolts 34 should be made so as not to introduce electrically corrosive activity between the bolt material and the material of anode 28. Plastic materials are acceptable.

Protruding inwardly from the inner surface of each of shells 30a and 30b are a series of nibs or spurs 36 which are cast integrally with the shells. Spurs 36 are properly sized to tightly engage the pipe sections 12 and 14 and make electrical contact therewith.

During assembly of the device of FIGS. 1 and 2, the mastic coated coating material 22, 24 can be applied over the cutback and the anode shell halves are placed in position thereover. The bolts 34 are assembled through the flanges and are tightened until the spurs 36 penetrate the coating 22, 24 and tightly engage the pipe outer surface.

The device shown in FIG. 3 differs in three respects from that shown in FIGS. 1 and 2. Firstly, the anode 28 has opposing shells 30a and 30b which are provided, respectively, with a receptacle and rib to form a hinge seam 40 opposing a seam formed at a pair of flanges 32 and a bolt 34. Additionally, the anode extends beyond the cutback to overlap the mill coatings 18 and 20 and the space between the anode and the joined pipes at the cutback is filled with mastic 24, omitting the layer of coating material 22. The mastic may be adhered to the inner surface of both halves of the anode prior to its installation on the pipe as is described in connection with FIG. 10 hereafter. The third difference is that a plurality of electrically conductive balls 42, of copper or other electrically conductive material, are embedded within mastic 24 and provide the electrical contact between the pipe and anode. In a preferred form, the anode shell halves can be coated on their inner surfaces with the mastic as a prepackaged device with release paper over the mastic much in the manner described below with reference to FIG. 10. Again, tightening of bolt 34 during assembly of the device assures good electrical contact and since the mastic is of a mushy consistency, the coating will be spread about thoroughly and over the ends of the mill coating when the bolts 34 are tightened.

The device shown in FIGS. 4 and 5 differs from that shown in FIG. 3 in that the coating layer 22 is included and the balls 42 are embedded in and carried by the total combination of layer 22 and 24. The balls can be suitably so embedded during or after extrusion of layer 22. Additionally, the anode 28 is of sheet metal and is merely wrapped around the layer 22 and is secured by suitable straps 46 and strap tightening device 48.

The device of FIG. 6 can best be described with respect to its assembly. Accordingly, the anode 28, which has centrally opposing seam lines as in FIGS. 2 or 3, is assembled over the cutback after pipe sections 12 and 14 are welded together. Thumb screws 52 are then adjusted to press against the pipe for electrical contact therewith and to space the anode 28 properly around the cutback, centering the pipe within the anode. A port 28a is provided through the wall of anode 28 for introducing hot mastic material to form the mastic layer 24. Thus the anode 28, in combination with the pipe at the cutback, provides a mold for the mastic material. It may be noted that the anode 28 overlaps coatings 18 and 20 and is spaced circumferentially from the outer surface of the coating. This permits escape of air during pouring of the mastic and it has been found that very little mastic, if any, leaks from the open ends of anode 28 before solidifying or jelling.

FIG. 7 illustrates another system for electrically contacting the anode with the pipe. In this form, a wire 58 is threaded through the combination of sheet metal 22 and mastic 24 and electrically conductive contact elements 56 are soldered to the ends of the wire on the mastic side and to a central portion of the wire on the sheet 22 side. The combination of sheet 22 and mastic 24, carrying the electrically conductive connection device, is applied to the pipe and the anode is applied thereover. The clamping action of bolts 34 or strap tightening device 48 or similar clamping system forces and holds the contacts 56 into electrical contact with the anode 28 and the pipe sections 12 and 14. In this system, the pipe sections 12 and 14 are not primed in the area of contact.

Turning to FIGS. 8 and 9, another form of anode is shown as a shell tapered toward both ends. The shell is made up of shell halves 30a and 30b which are secured in two opposing seam lines by suitable means such as bolts 34. A set screw 62, threaded in a bore of the shell, is used to make electrical contact with weld 16. The tapered flanges of FIGS. 1 and 2 are preferred since they eliminate projections of undue size which might snag while plowing in or dragging an assembled series of pipe sections to an installation site.

FIG. 10 illustrates an assembly of shell half 30a with the sheet 22 and mastic 24 layers. The outer surface of sheet 22 is secured by suitable adhesives 66 to the inner surface of shell half 30a. The inner surface of mastic 24 is covered with a suitable release paper 68, e.g., silicone impregnated paper. The release paper 68 keeps mastic 24 from adhering to itself until the device is ready for use, at which time the release paper 68 is removed. After removal of the release paper, the device is placed around the cutback and the mastic 24 is adhered to the pipe over the length and throughout the circumference of the cutback to overlap mill coatings 18 and 20 as shown in FIG. 1. The other shell half 30*b* is then placed in registry with shell half 30*a* and bolts 34 are inserted and tightened. The device of FIG. 10 is especially preferred because it is a suitable anodic protecting device which can be manufactured and shipped to the field in a prepackaged form which is easily and quickly installed for complete protection of a pipe joint. The outer surface of the anode can be provided with a coating of salt material, e.g. as shown at 72 in FIGS. 8 and 9, which is sufficiently soluble in water to provide an electrolyte within the water and the soil surrounding the anode. Alternatively, or additionally, the outer surface of the anode can be masked in places with a plastic coating material, e.g. as shown at 74 in FIG. 7, to slow down or localize the anodic action.

I claim:

1. A sacrificial anode capable of fitting around a pipe comprising:

shell means having a cylindrical wall of anodic material forming the inner surface thereof;

electrical contact means including a plurality of electrically conductive balls for electrically contacting the wall with a pipe when the anode is therearound;

coating means on the inner surface of the wall securing the balls therein; and means for opening and closing the shell means around a pipe and urging said electrical contact means towards said pipe.

2. A sacrificial anode capable of fitting around a pipe comprising:

shell means including a cylindrical wall of anodic material forming the inner surface thereof and an outer surface tapered toward at least one end of the shell means defining a drag surface for longitudinally dragging the anode when assembled on a pipe;

electrical contact means projecting from said inner surface for electrically contacting the wall with a pipe when the anode is therearound; and means for opening and closing the shell means around a pipe and urging said electrical contact means towards said pipe.

3. The anode of claim 2 wherein the outer surface tapers toward both ends of the shell means.

4. A sacrificial anode capable of fitting around a pipe comprising:

a resilient sheet of tubular configuration having a cylindrical wall of anodic material forming the inner surface thereof and having a seam joint;

electrical contact means projecting from said inner surface for electrically contacting the wall with a pipe when the anode is therearound; and strap members for holding the sheet in tubular configuration around a pipe.

* * * * *